United States Patent [19]

Klose

[11] 4,306,931
[45] Dec. 22, 1981

[54] THREE WHEEL STITCHING APPARATUS

[75] Inventor: Karl W. Klose, Findlay, Ohio

[73] Assignee: Cooper Tire & Rubber Company, Findlay, Ohio

[21] Appl. No.: 137,394

[22] Filed: Apr. 4, 1980

[51] Int. Cl.³ .................................. B29H 17/18
[52] U.S. Cl. .................................. 156/413; 156/421
[58] Field of Search ............... 156/408, 409, 410, 411, 156/412, 413, 421

[56] References Cited

U.S. PATENT DOCUMENTS

| | | | |
|---|---|---|---|
| 1,721,842 | 7/1929 | Thropp et al. | 156/410 |
| 3,819,449 | 6/1974 | Caretta | 156/413 |
| 4,004,961 | 1/1977 | Takasuga et al. | 156/421 |
| 4,039,366 | 8/1977 | Yabe | 156/405 |
| 4,057,455 | 11/1977 | Klose | 156/410 |

Primary Examiner—John E. Kittle
Attorney, Agent, or Firm—Kemon & Estabrook

[57] ABSTRACT

An apparatus for stitching the components of a pneumatic tire consisting of a left and right hand assembly both of which are capable of arcuate displacement toward and away from each other. Each assembly includes an arm having a rolling device or stitcher wheel thereon for engaging the material that is being consolidated in building the tire body. The arm of one of the assemblies has mounted thereon, as a slave member, a third arm which carries a different type of stitcher wheel for engaging and stitching the center area of the superimposed belts or plys of the pneumatic tire prior to the engagement of the body by the other stitcher wheels.

8 Claims, 8 Drawing Figures

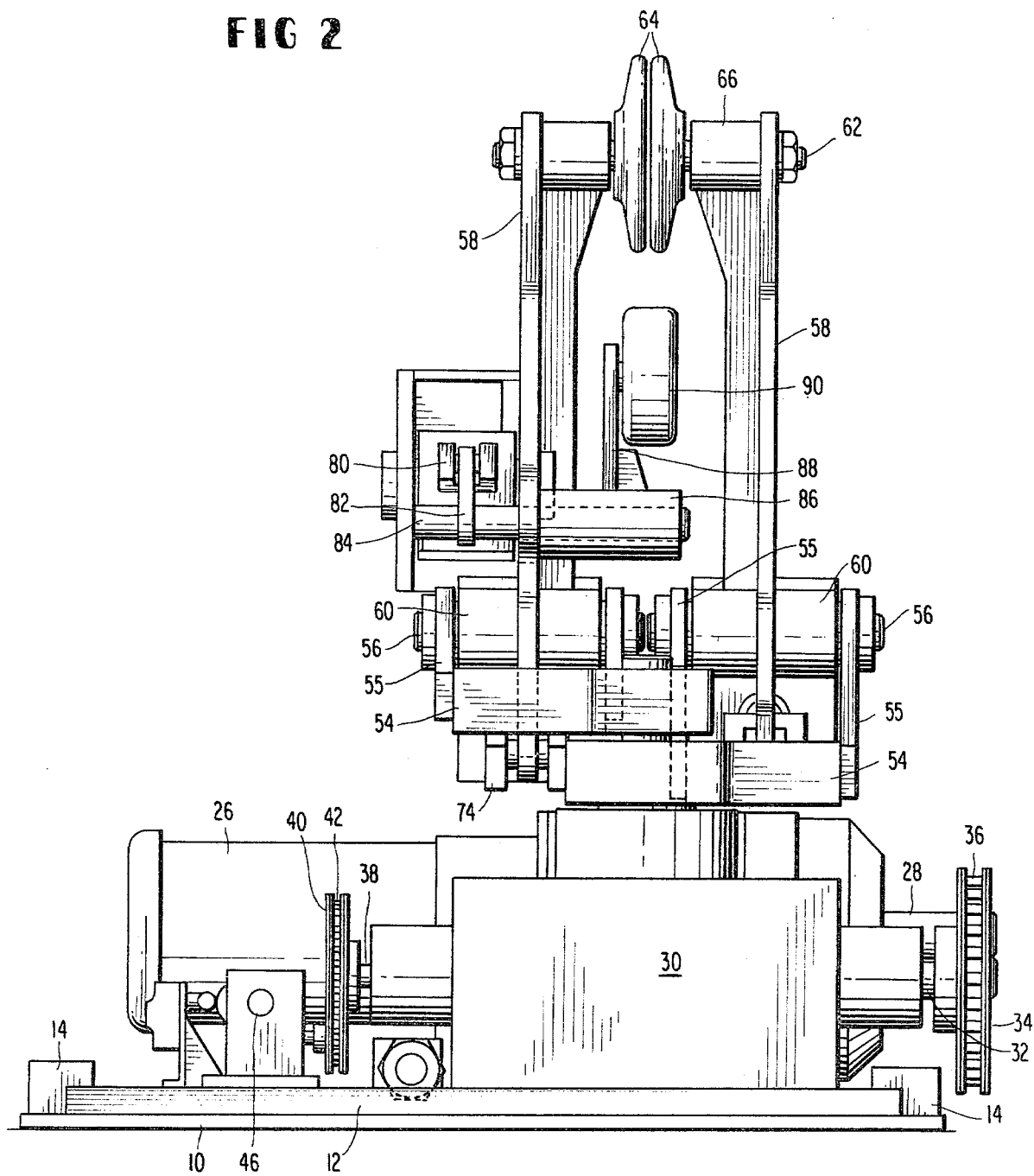

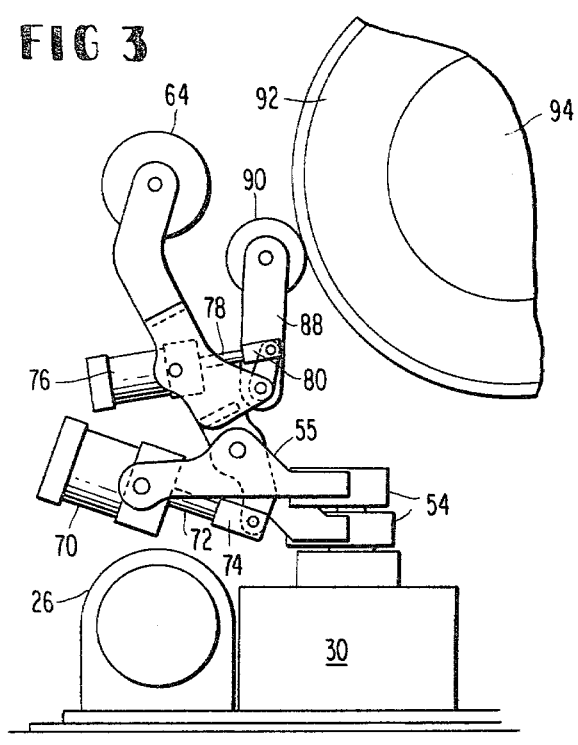
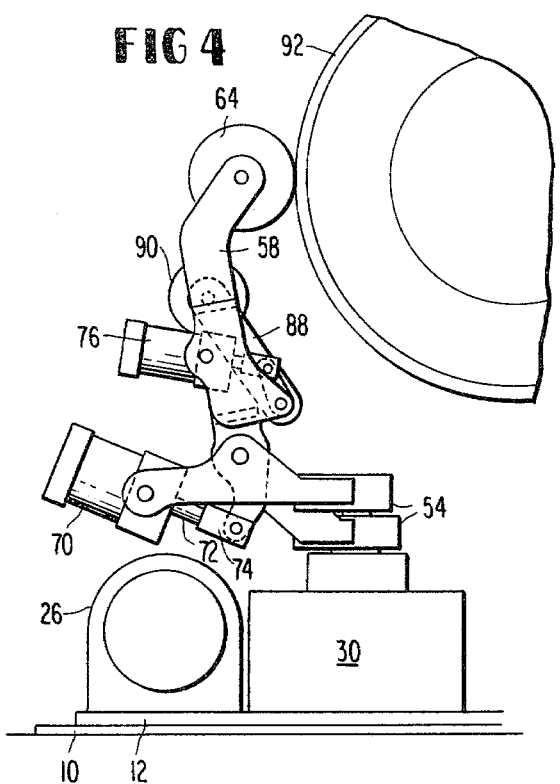
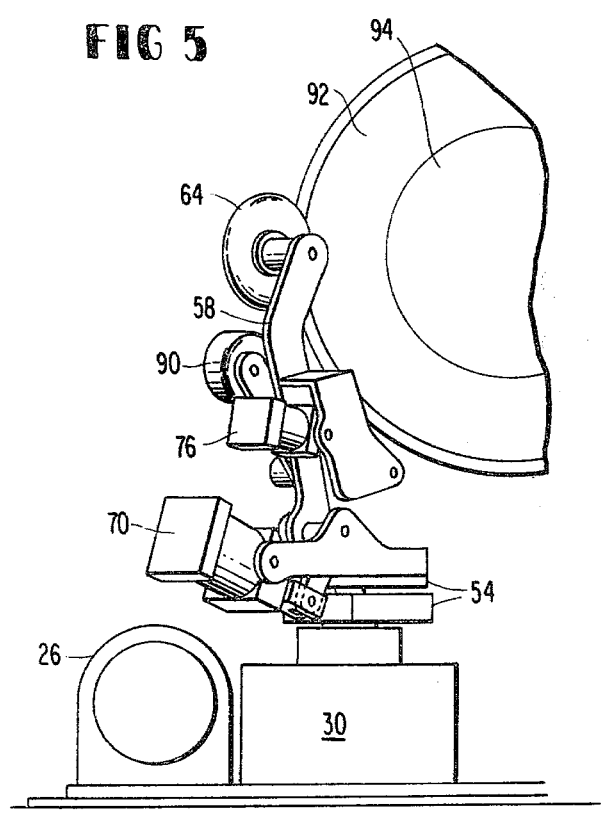
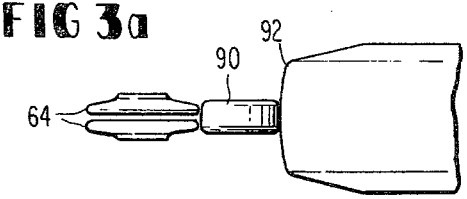
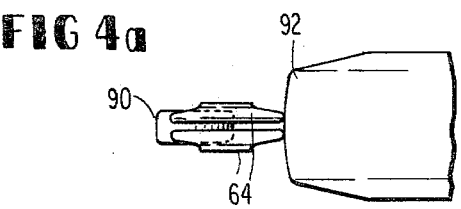
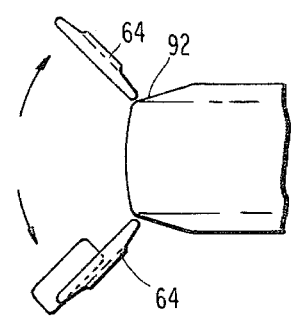

THREE WHEEL STITCHING APPARATUS

BACKGROUND OF THE INVENTION

When sheets of rubberized fabric are being assembled, such as during the building of tires, it is necessary to bring the tacky surfaces of said sheets into intimate contact and to work out entrained air by rolling the surface with a narrow rolling device commonly referred to as a stitcher. A stitching apparatus of the foregoing type is illustrated in Applicant's prior U.S. Pat. No. 4,057,455 dated Nov. 8, 1977.

The rolling devices or stitcher wheels are normally rounded at the point of contact with the rubberized sheets so that with the stitcher wheels engaging said sheets and moving outwardly in opposite directions toward the tire edge there remains a central area that is not engaged by said wheels. The prior art does teach the concept of multi-wheel stitchers but such devices are of the static type having three or more wheels. The patents to Thorpe et al U.S. Pat. No. 1,721,842 dated July 23, 1929 and Caretta U.S. Pat. No. 3,819,449 dated June 25, 1974 and Takasuge U.S. Pat. No. 4,004,961 dated Jan. 25, 1977 are illustrative of such prior art devices. In many instances the multi-wheel stitchers of the prior art are arranged to progressively engage the tread component of a tire with the various wheels and such engagement tends to produce trapped air pockets due to such intermittent engagement. In certain prior devices the stitcher wheels are not capable of stitching tire components other than the tread portion.

In an attempt to overcome the shortcomings of known stitcher assemblies, and particularly as concerns the center portion or area of a tire, specifications were devised calling for a manual stitching operation at the center section of a tire. Such a concept is not only time consuming, but it is a laborious task that is not uniform at all times, especially as concerns the degree of manual pressure applied, thus, quite often a poorly produced stitchout is obtained at the center portion or area of the tire.

SUMMARY OF THE INVENTION

The present invention is directed to a stitching apparatus comprising a lefthand assembly and a righthand assembly said assemblies being interacting and each said assembly including an arm and a rolling device that is adapted to engage the tire. In addition, the arms of one of the assemblies has mounted thereon a third arm having a center stitch mechanism with the third arm acting as a slave member but being capable of movement independently of the movement of either of the assemblies.

In the stitching apparatus of the present invention, when stitching is initiated, the third arm assembly or center stitcher advances towards and engages the center area of the tire. This center area of the tire is effectively stitched for a period of time after which the center stitcher is retracted and the left and right hand stitcher arm assemblies advance and engage the tire and undertake the stitching of the tire in the conventional manner. Thus, the present invention the entire tread and shoulder surface of the tire is stitched which includes the central area that is not covered or engaged by the wheels of the left and right hand assemblies.

It is to be further noted that in the present concept the stitcher wheels contact the surface or area to be stitched in a sequential manner. That is the center area is stitched first by a single stitcher wheel which is then withdrawn. The two remaining stitcher wheels then make contact and overlap to a degree the path of the first stitcher wheel and continue to carry out the remainder of the stitching operation. In this manner any bubbles present are progressively worked to the outer extremities and thus to the atmosphere.

BRIEF DESCRIPTION OF THE DRAWING

FIG. 2 is a front elevational view of the tire stitching apparatus shown in FIG. 1;

FIG. 3 is a side elevational view showing the third stitching wheel in operative position;

FIG. 3A is a detailed plan view of the third stitching wheel engaging the center portion of the tire body;

FIG. 4 is a view similar to FIG. 3 showing the third stitching wheel in its retracted position; and the two main stitcher wheels engaging the tire body;

FIG. 4A is a detailed plan view showing the third stitcher wheel retracted and the two main stitcher wheels engaging the tire body;

FIG. 5 is a detailed elevational view showing one of the main stitcher wheels moving over the surface of the tire body; and FIG. 5A is a detailed plan view showing the main stitcher wheels moving over the edge of the tire body.

DESCRIPTION OF THE PREFERRED EMBODIMENT

Figure 1:
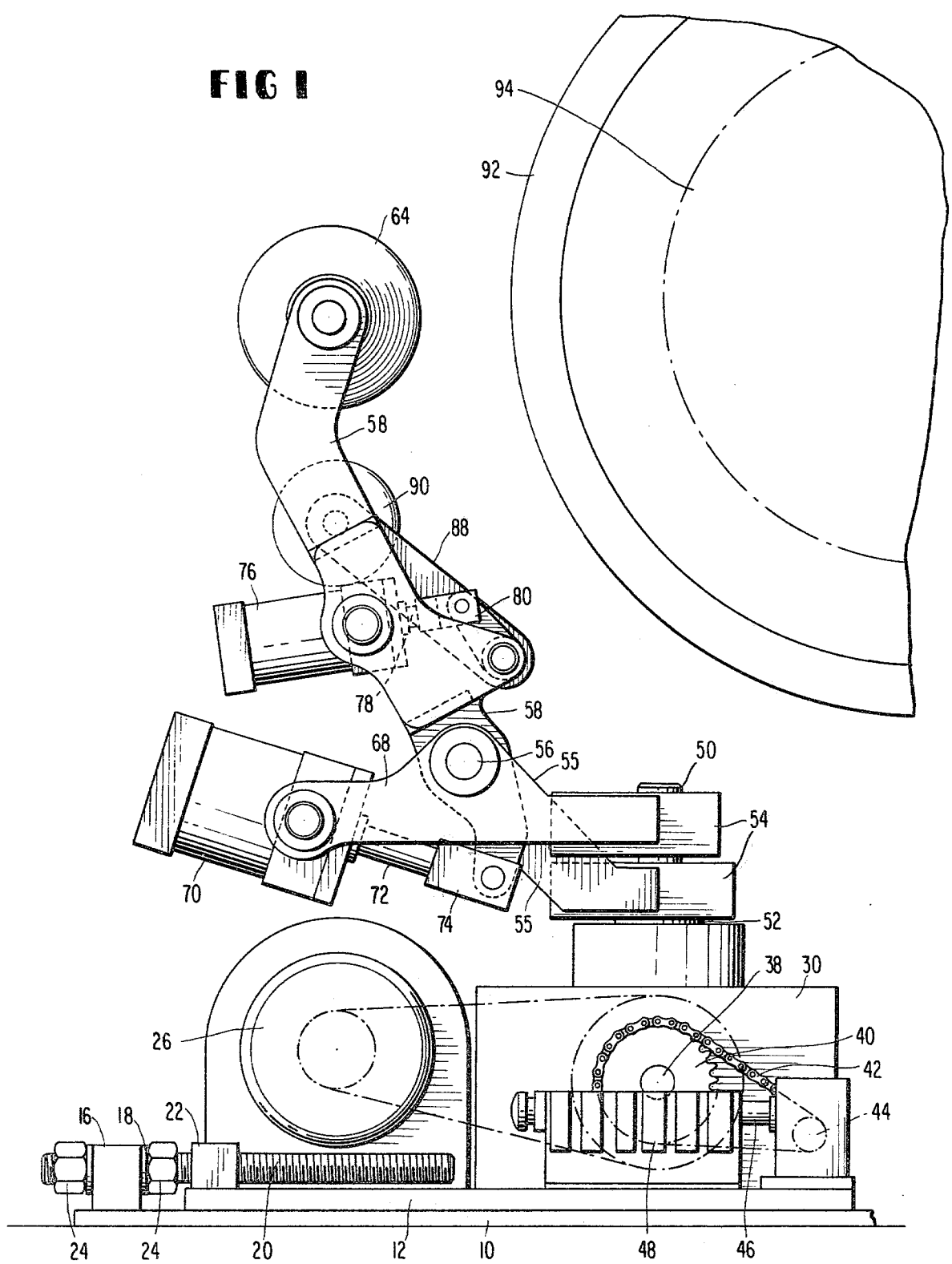
FIG. 1 is a side elevational view of a tire stitching apparatus embodying the present invention.

Referring to the drawings there is shown in FIGS. 1 and 2 a stitching apparatus including a rectangular shaped support member 10 having a base 12 mounted thereon by guide and clamp members 14. The support member 10 is provided with a bearing 16 having a thrust bearing 18 for receiving an adjusting screw 20 which engages a threaded boss 22 mounted on the base 12. The adjusting screw 20 is also provided with suitable nuts 24 for retaining said screw 20 in locked position with respect to the thrust bearing 18.

The base 12 has mounted thereon a suitable motor and housing 26 with a drive shaft 28 projecting therefrom upon which is mounted a suitable drive sprocket, not shown. The base 12 also has mounted thereon a gear box 30 that is provided with a planetary gear train of conventional design, not shown. The gear box 30 has projecting from an end thereof a drive shaft 32 which is provided with a sprocket gear 34 having mounted thereon a sprocket chain 36. The sprocket chain 36 is entrained about the drive sprocket mounted upon the shaft 28 projecting from the motor housing 26. The gear box 30 has projecting from the other end thereof a drive shaft 38 that is provided with a sprocket 40 having a chain 42 for driving a sprocket 44 which in turn drives a cam shaft 46 having a plurality of micro switches 48 associated therewith.

The gear box 30 has projecting upwardly from the top thereof a shaft 50 and a concentrically disposed sleeve 52 which are rotatably driven in contra-relationship with one another by the planetary gear drive in the gear box 30. The shaft 50 and sleeve 52 are capable of being rotated in a clockwise direction as well as in a counterclockwise direction. The shaft 50 and sleeve 52 each have affixed thereto a stitcher arm carriage 54 which is provided with a pair of spaced arms 55 that have mounted in the ends thereof a support rod 56 upon which is pivotally mounted a stitcher arm 58. The stitcher arms 58 adjacent their lower ends are formed with enlarged bosses 60 that are positioned on the support rods 56 intermediate the arms 55 and are capable of pivoting about said support rods 56. The upper ends of the stitcher arms 58 are provided with stub shafts 62 that have mounted on the inner ends thereof conventional stitcher wheels 64 with spacer collars 66 being positioned between said stitcher wheels and said arms 58.

The arms 55 of each of the stitcher arm carriages 54 are formed with angular projections or extensions 68 that have mounted there between an air cylinder 70. The cylinder 70 has projecting from an end thereof a piston rod 72 which has mounted thereon a clevis 74 that in turn engages the lower end of the stitcher arm 58 to pivot same about the support rod 56.

As illustrated in FIG. 1 and FIG. 2 one of the stitcher arms 58 has mounted thereon, as a slave member, a cylinder 76 with a piston rod 78 projecting therefrom which is connected to a clevis 80. The clevis 80 is connected to an end of an arm 82 which is secured to an end portion of a shaft 84 that has a carriage member 86 affixed thereto. The carriage member 86 has a stitcher arm 88 connected thereto with a relatively thick and enlarged stitcher wheel 90 rotatably mounted on the free end thereof.

In the use of the stitching apparatus of the present invention the motor in the housing 26 will, through the sprockets and sprocket chain 36, drive the shaft 32 and, in turn, the planetary gears in the gear box 30. The rotation of the shaft 50 and sleeve 52 will be under the control of the micro switches 48 as will the movement of the stitcher arms 58 towards and away from the tire carcass 92 positioned upon a tire building drum 94. After a belt or ply has been placed upon the tire carcass 92, in the customary manner of building a tire, the air cylinder 76 is brought into operation for actuating the piston rod 78 and clevis 80 and thus moving the stitcher arm 88 and stitcher wheel 90 into engagement with the tire carcass.

The stitcher wheel 90 is of a width greater than the combined width of the pair of stitcher wheels 64 and said stitcher wheel 90 has somewhat of a flat peripheral surface designed to engage the center section of the tire carcass, FIG. 3A. The movement of the third stitcher wheel 90 into engagement with the center portion of the tire carcass, while the stitcher wheels 64 are retained in an inoperative state, enables the central portion or area of the tire carcass to be thoroughly stitched under constant and uniform pressure. This insures that the central area or segment of the belt or ply is in firm engagement with the previously applied belt or ply of the tire carcass. After the stitcher wheel 90 has completed its stitching operation the piston rod 78 is retracted into the cylinder 76 which results in the retraction of the stitcher arm 88 and stitcher wheel 90 to the position shown in FIGS. 1 and 4.

Upon the retraction of the stitcher wheel 90 to its inoperative position of FIGS. 1 and 4 said stitcher wheel 90 becomes a slave member as the stitcher arms 58 are actuated by the pistons 72 of cylinders 70 to wherein the stitcher wheels 64 engage the tire carcass 92, FIGS. 4 and 4A. As the stitcher wheels 64 move in and engage the tire carcass, they overlap a portion of the area of the tire carcass that was stitched by the wheel 90, FIG. 4A, and the stitcher wheels 64 proceed to stitch the tire carcass in the customary manner, such as illustrated in FIG. 5A. The advancement and retraction of the third stitcher wheel 90 prior to the actuation of the stitcher wheels 64 insures the carrying out of separate and independent stitching operations with the stitching wheels 64 overlapping a portion of the area previously stitched by the stitcher wheel 90.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. An apparatus for stitching plies of rubberized fabric to form a tire carcass having round shoulders and mounted upon a suitable rotatable building drum;
   a base member;
   a gear box positioned on said base with motor means for driving the gears in said box;
   a concentrically arranged shaft and sleeve projecting from said gear box for contra-rotation with respect to one another;
   stitcher arm carriages mounted on said shaft and said sleeve;
   a stitcher arm pivotally mounted on each of said carriages with a stitcher wheel rotatably mounted in an end of said stitcher arm;
   means carried by said carriages and engagable with said stitcher arms for pivotally moving said stitcher arms and the wheels thereon into engagement with each ply of rubberized fabric as it is positioned upon said drum for stitching said ply to the tire carcass with said wheels moving from the center area of the tire carcass outwardly towards and around said rounded shoulders;
   one of said stitcher arms having an arm pivotally mounted thereupon;
   a stitcher wheel rotatably mounted on the end of said arm;
   means mounted upon said one of said stitcher arms and engaging said arm for moving said arm and stitcher wheel into engagement with the center area of each ply of rubberized fabric for stitching said area to said tire carcass and subsequently retracting said arm and stitcher wheel prior to the moving of said stitcher arms and wheels into engagement with said ply with said last mentioned wheels engageing and overlapping only a portion of said center area.

2. An apparatus as set forth in claim 1 wherein said first named means includes a cylinder and piston engagable with each stitcher arm for pivotally advancing and retracting the stitcher wheels with respect to said drum.

3. An apparatus as set forth in claim 1 wherein said second mentioned means includes a cylinder and piston connected to said arm.

4. An apparatus as set forth in claim 1 wherein said arm and stitcher wheel mounted on said stitcher arm remain in a retracted position during the engagement of said stitcher arms and wheels with the tire carcass.

5. An apparatus as set forth in claim 1 wherein said stitcher arm carriages have one end of said spaced arms connected thereto with a cylinder and piston connected to the other end of said spaced arms.

6. An apparatus as set forth in claim 5 wherein said stitcher arms are pivotally connected intermediate their ends to said spaced arms with said cylinder and piston connected to the lower end of said stitcher arms and said stitcher wheels mounted on the upper end of said stitcher arms.

7. An apparatus as set forth in claim 1 wherein said stitcher wheel mounted on said arm and carried by said stitcher arm is formed with a relatively large surface for engaging the center of the tire carcass.

8. An apparatus as set forth in claim 1 wherein said gear box is provided with a drive shaft and sprocket for rotating a cam shaft to actuate a plurality of micro switches to control the sequential operation of the stitcher arms and wheels and said arm and stitcher wheel.

\* \* \* \* \*